(12) United States Patent
Jensen

(10) Patent No.: US 10,532,721 B2
(45) Date of Patent: Jan. 14, 2020

(54) CAR WASH SPRAY DEVICES, SYSTEMS, AND ASSOCIATED METHODS

(71) Applicant: Dustin Jensen, Draper, UT (US)

(72) Inventor: Dustin Jensen, Draper, UT (US)

( * ) Notice: Subject to any disclaimer, the term of this patent is extended or adjusted under 35 U.S.C. 154(b) by 128 days.

(21) Appl. No.: 15/412,987

(22) Filed: Jan. 23, 2017

(65) Prior Publication Data

US 2018/0208159 A1  Jul. 26, 2018

(51) Int. Cl.
| | | |
|---|---|---|
| *B08B 3/02* | (2006.01) | |
| *B60S 3/04* | (2006.01) | |
| *B05B 1/30* | (2006.01) | |
| *B05B 3/02* | (2006.01) | |
| *B05B 15/65* | (2018.01) | |

(52) U.S. Cl.
CPC .............. *B60S 3/04* (2013.01); *B05B 1/3006* (2013.01); *B05B 3/02* (2013.01); *B05B 15/65* (2018.02); *B08B 3/024* (2013.01)

(58) Field of Classification Search
CPC ......... B60S 3/04; B05B 15/65; B05B 1/3006; B05B 3/02; B05B 3/024; B08B 3/24
USPC ....................................................... 134/123
See application file for complete search history.

(56) References Cited

U.S. PATENT DOCUMENTS

| | | | |
|---|---|---|---|
| 5,853,127 A * | 12/1998 | Heembrock | ............. B08B 3/02 239/227 |
| 6,154,916 A | 12/2000 | Ayers | |
| 6,402,052 B1 * | 6/2002 | Murawa | ................ B05B 1/3006 239/284.1 |
| 7,438,075 B1 | 10/2008 | Huntington et al. | |
| 8,069,867 B2 | 12/2011 | Turner et al. | |

OTHER PUBLICATIONS

Washworld High Velocity Wash System, Rev. Feb. 2006, Section 6—Maintenance.

* cited by examiner

*Primary Examiner* — Michael E Barr
*Assistant Examiner* — Tinsae B Ayalew
(74) *Attorney, Agent, or Firm* — Thorpe North & Western LLP

(57) ABSTRACT

A car wash spray device can include a fluid inlet to receive a pressurized fluid from a fluid source. The car wash spray device can also include a first spray nozzle, and a first pressure-sensitive valve in fluid communication with the fluid inlet and the first spray nozzle. The first pressure-sensitive valve can be configured to allow flow of the pressurized fluid therethrough at or below a first pressure. The car wash spray device can further include a second spray nozzle, and a second pressure-sensitive valve in fluid communication with the fluid inlet and the second spray nozzle. The second pressure-sensitive valve can be configured to allow flow of the pressurized fluid therethrough at or above a second pressure. Controlling a pressure of the pressurized fluid can facilitate delivery of the pressurized fluid through at least one of the first nozzle and the second nozzle.

20 Claims, 4 Drawing Sheets

CAR WASH SPRAY DEVICES, SYSTEMS, AND ASSOCIATED METHODS

BACKGROUND

Current vehicle wash systems utilize brushes to physically remove material or utilize only pressurized fluid (e.g., water and water/chemical solutions) in "touchless" systems to remove material. Touchless systems commonly include a spray "arch" that includes nozzles aimed at the exterior surfaces of a vehicle being washed. The arch can be reoriented to direct fluids at the vehicle from different angles to perform one or more wash functions during a washing operation. The position and orientation of the spray arch as well as the fluid composition provided to the arch can be computer-controlled for appropriate dispensing of chemicals during a wash cycle. Spray arches typically utilize only a single type of nozzle and all nozzles on an arch receive fluid simultaneously.

DETAILED DESCRIPTION

Figure 1:
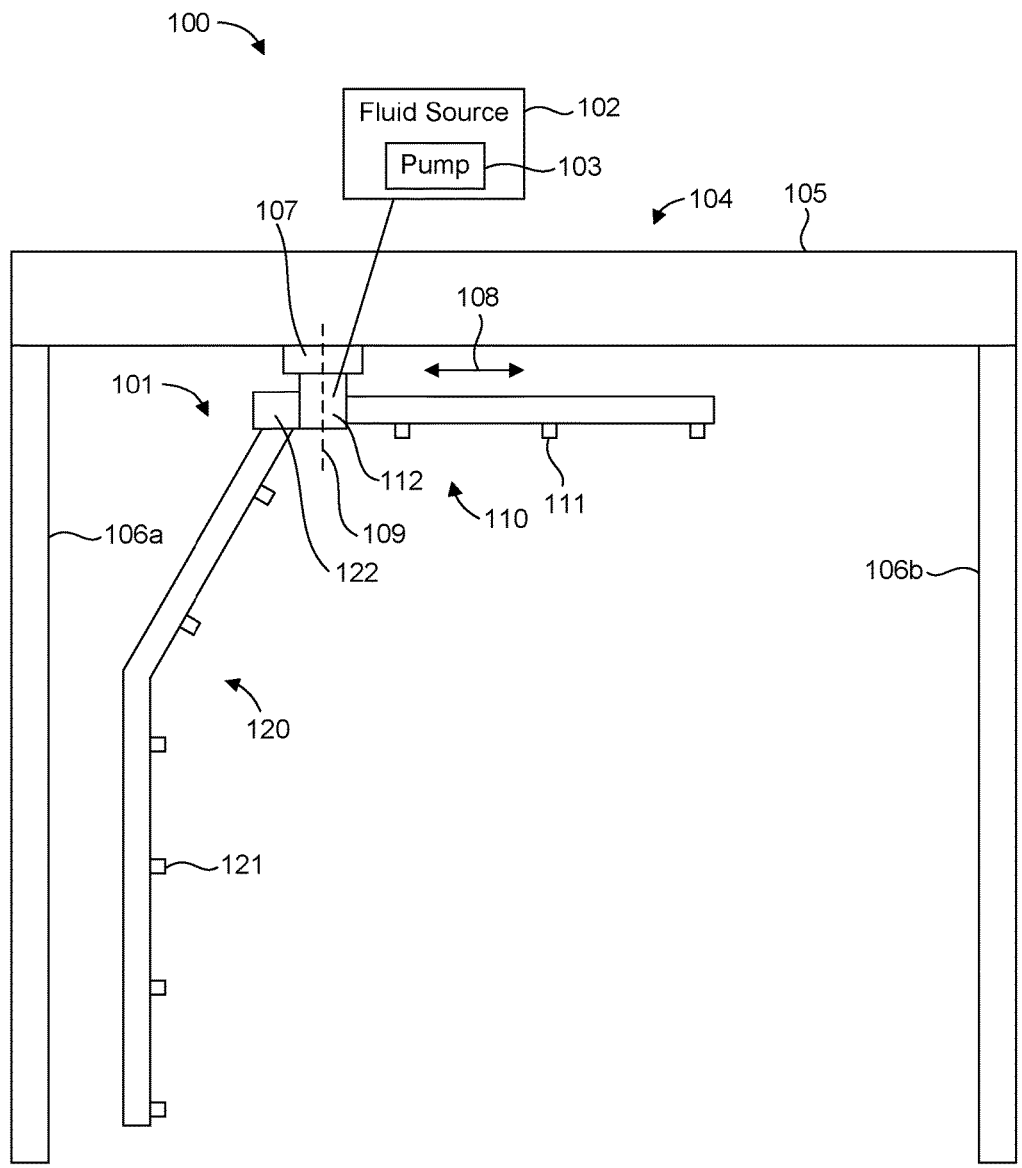
FIG. 1 is an end view of a car wash spray system, in accordance with an example of the present disclosure.

Reference will now be made to the exemplary embodiments, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention. It is also to be understood that the terminology used herein is used for the purpose of describing particular embodiments only. The terms are not intended to be limiting unless specified as such.

It is noted that, as used in this specification and the appended claims, the singular forms "a," "an," and "the" include plural referents unless the content clearly dictates otherwise.

In describing embodiments of the present disclosure, reference will be made to "first" or "second" as they relate to spacer threaded portions or other structures, for example. It is noted that these are merely relative terms, and a spacer threaded portion described or shown as a "first" threaded portion could just as easily be referred to a "second" threaded portion, and such description is implicitly included herein.

Dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight ratio range of about 1 wt % to about 20 wt % should be interpreted to include not only the explicitly recited limits of about 1 wt % and about 20 wt %, but also to include individual weights such as 2 wt %, 11 wt %, 14 wt %, and sub-ranges such as 10 wt % to 20 wt %, 5 wt % to 15 wt %, etc.

In accordance with these definitions and embodiments of the present disclosure, a discussion of the various systems and methods is provided including details associated therewith. This being said, it should be noted that various embodiments will be discussed as they relate to the systems and methods. Regardless of the context of the specific details as they are discussed for any one of these embodiments, it is understood that such discussion relates to all other embodiments as well.

The present disclosure is drawn to a car wash spray device. The car wash spray device can include a fluid inlet to receive a pressurized fluid from a fluid source. The car wash spray device can also include a first spray nozzle and a first pressure-sensitive valve in fluid communication with the fluid inlet and the first spray nozzle. The first pressure-sensitive valve can be configured to allow flow of the pressurized fluid therethrough at or below a first pressure. The car wash spray device can further include a second spray nozzle and a second pressure-sensitive valve in fluid communication with the fluid inlet and the second spray nozzle. The second pressure-sensitive valve can be configured to allow flow of the pressurized fluid therethrough at or above a second pressure. Controlling a pressure of the pressurized fluid can facilitate delivery of the pressurized fluid through at least one of the first nozzle and the second nozzle.

In one aspect, the disclosure provides a car wash spray system. The system can comprise a fluid source and a car wash spray device. The car wash spray device can include a fluid inlet coupled to the fluid source to receive a pressurized fluid from the fluid source. The car wash spray device can also include a first spray nozzle and a first pressure-sensitive valve in fluid communication with the fluid inlet and the first spray nozzle. The first pressure-sensitive valve can be configured to allow flow of the pressurized fluid therethrough at or below a first pressure. The car wash spray device can further include a second spray nozzle and a second pressure-sensitive valve in fluid communication with the fluid inlet and the second spray nozzle, the second pressure-sensitive valve being configured to allow flow of the pressurized fluid therethrough at or above a second pressure. Controlling a pressure of the pressurized fluid can facilitate delivery of the pressurized fluid through at least one of the first nozzle and the second nozzle.

In another aspect, the disclosure provides a method for washing a car. The method can comprise obtaining a car wash spray device having a fluid inlet coupled to a fluid source to receive a pressurized fluid from the fluid source, a first spray nozzle, a first pressure-sensitive valve in fluid communication with the fluid inlet and the first spray nozzle, the first pressure-sensitive valve being configured to allow flow of the pressurized fluid therethrough at or below a first pressure, a second spray nozzle, and a second pressure-sensitive valve in fluid communication with the fluid inlet and the second spray nozzle, the second pressure-sensitive valve being configured to allow flow of the pressurized fluid therethrough at or above a second pressure. The method can also comprise providing the pressurized fluid to the fluid inlet at a pressure at or below the first pressure to deliver the pressurized fluid through the first nozzle. Additionally, the method can comprise providing the pressurized fluid to the fluid inlet at a pressure at or above the second pressure to deliver the pressurized fluid through the second nozzle.

FIG. 1 shows a schematic diagram of a car wash spray system 100 in accordance with an example of the present disclosure. In general, the car wash system 100 can include a car wash spray device 101 and a fluid source 102 that can provide water and water/chemical solutions to the car wash spray device 101 dispensed at a suitable pressure as described herein, which may be according to a programmed wash cycle. For example, the fluid source 102 can include a chemical storage and mixing facility to supply washing and rinsing fluids to the car wash spray device 101. In addition, the fluid source 102 can include a pump 103 to provide car wash chemical fluid to the car wash spray device 101 at a suitable pressure, which may vary as described below. The pump 103 can be of any suitable pump type or design. For example, the pump 103 can comprise a piston, an impeller, a diaphragm, a centrifugal booster, multiple stages, or any other suitable pump feature or design. In one aspect, the fluid source 102 can utilize only a single pump, although it should be recognized that multiple pumps can be used, such as in a parallel arrangement to provide redundancy and/or to increase capacity. Valves can control the flow of cold and/or hot water to the pump 103.

The car wash spray device 101 can be configured as an "arch" that includes a generally horizontal top portion 110 and a generally vertical lateral portion 120. The portions 110, 120 can have spray nozzles 111, 121, respectively, in communication with the fluid source 102 that are oriented to direct spray at exterior surfaces of a vehicle (not shown). The portions 110, 120 of the car wash spray device 101 illustrated in FIG. 1 form an arch having an L-configuration, although other arch configurations are possible. The portions 110, 120 can include fittings or couplings 112, 122, respectively, to couple the portions 110, 120 to one another.

The car wash spray device 101 is particularly suitable for use in a "touchless" car wash system that removes dirt by directing water and water/chemical solutions through the nozzles 111, 121, but may be utilized in any suitable type of car wash system. As used herein, the terms "car" and "vehicle" are used interchangeably to refer to all types of vehicles including passenger cars, SUVs, trucks, busses, etc. The term "car wash" is used generically to refer to vehicle treatment procedures that may include simple wash sequences or more complex, multiple functions such as pre-soak, wash, rinse, rustproof, wax, and air-dry. As used herein, a car wash chemical can include a detergent (i.e., soaps, surfactants, etc.), a conditioner, a wax, or any other suitable chemical or additive for a car wash that can be mixed with water.

In one aspect, the car wash spray device 101 can be fixed or static and a vehicle can move relative to the car wash spray device 101. On the other hand, a vehicle can be fixed or static and the car wash spray device 101 can move relative to the vehicle (e.g., circumnavigate the vehicle). In this case, the car wash system 100 can include a movable support structure 104 supporting the car wash spray device 101. The movable support structure 104 can be configured to move the car wash spray device 101 in translational and rotational degrees of freedom. For example, the movable support structure 104 can include a movable cross-member 105, which can be movably supported by any number of laterally spaced vertical stationary support members 106a, 106b (e.g., beams) to facilitate movement of the cross-member 105 in a translational degree of freedom extending into and out of the page, such as on rails. The support members 106a, 106b are sufficiently tall and far enough apart laterally to accommodate vehicles of the type to be washed under the cross-member 105 and between the support members 106a, 106b with adequate clearance for equipment. In addition, the movable support structure 104 can include a carriage 107 movably supported by the cross-member 105 to facilitate movement of the carriage 107 in a translation degree of freedom 108. One of the fittings (e.g., the fitting 112) can serve to couple the car wash spray device 101 to the carriage 107. The carriage 107 can be configured to provide rotation of the car wash spray device 101 about an axis 109, such as by being rotatably coupled to the cross-member 105. Thus, the car wash spray device 101 can be translated and rotated during a wash cycle to facilitate washing about front, back, and sides of a vehicle disposed between the support members 106a, 106b. Translational movement and rotation of the car wash spray device 101 during a wash cycle can be automatic and computer-controlled using data from various sensors that may detect the location of the vehicle to prevent contact with the vehicle.

As described in more detail below, the car wash spray device 101 can be configured to selectively allow fluid to spray from a given nozzle or nozzles by varying the pressure of the fluid provided to the car wash spray device 101. This can enable the use of multiple nozzle types that can be selectively utilized during a car wash program cycle by varying the pressure of the supplied fluid.

Figure 2:
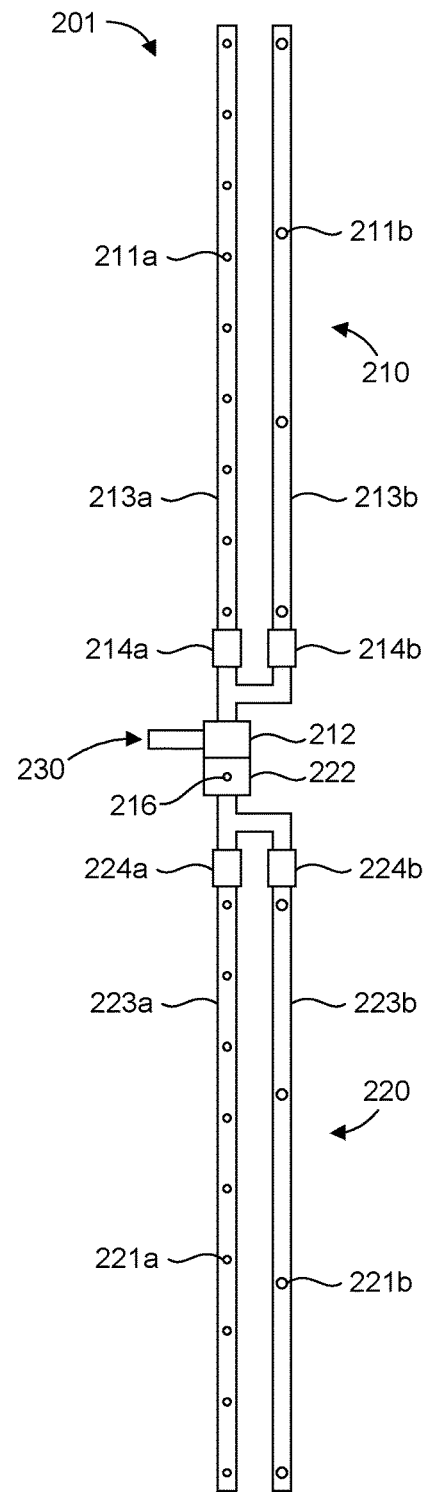
FIG. 2 is a schematic illustration of a car wash spray device, in accordance with an example of the present disclosure.
Figure 3:
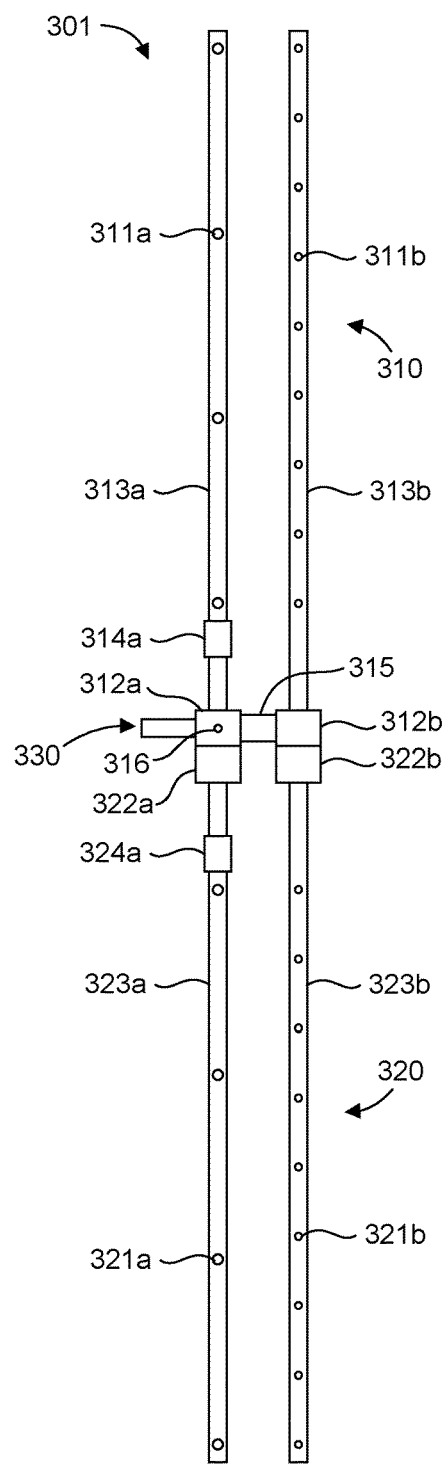
FIG. 3 is a schematic illustration of a car wash spray device, in accordance with another example of the present disclosure.
Figure 4:
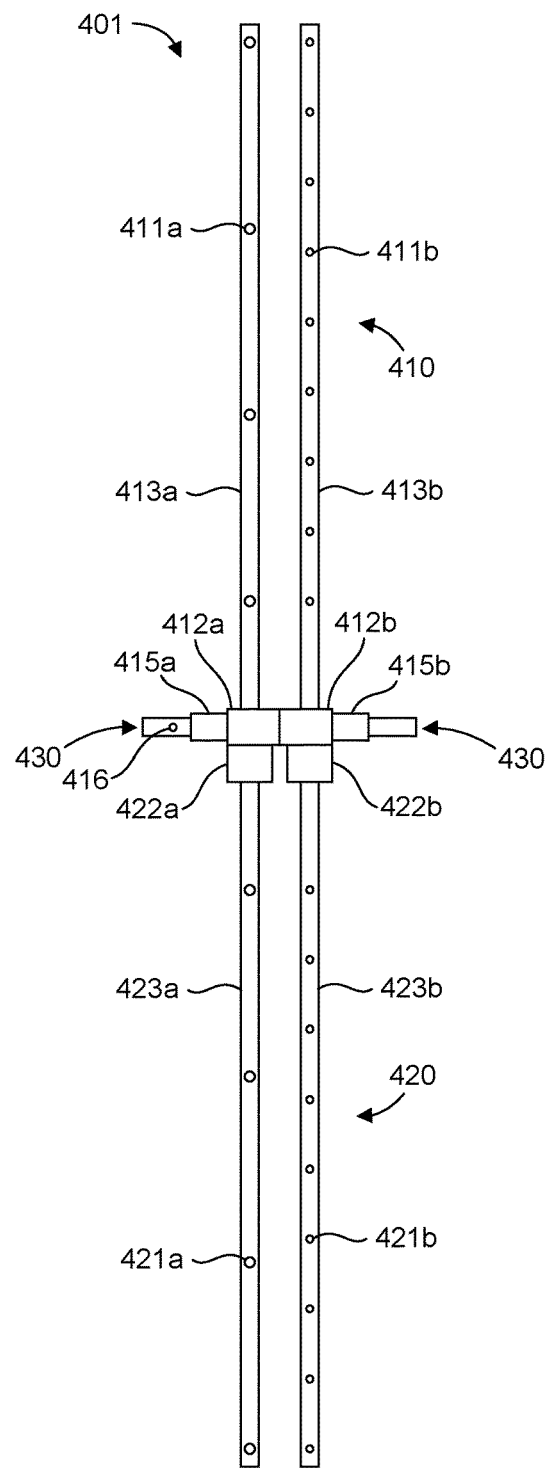
FIG. 4 is a schematic illustration of a car wash spray device, in accordance with yet another example of the present disclosure.

FIGS. 2-4 show schematic representations of car wash spray devices in accordance with several examples of the present disclosure that may be utilized in a car wash spray system. In order to demonstrate the principles of the present disclosure, these figures show "flattened" representations of car wash spray devices, which may be configured as arches (e.g., having an L-configuration). FIG. 2 illustrates a car wash spray device 201 that can include a generally horizontal top portion 210 and a generally vertical lateral portion 220. One or more of the portions 210, 220 can include multiple arms. For example, the portion 210 can include arms 213a, 213b, and the portion 220 can include arms 223a, 223b. The arms 213a-b, 223a-b can form or include fluid conduits. In some embodiments, the arms 213a-b, 223a-b can comprise pipes or tubes that at least partially define fluid conduits. In addition, each arm 213a-b, 223a-b can include one or more nozzles in communication with the fluid conduits to direct washing and rinsing fluids toward the top or horizontal surfaces of a vehicle. For example, each of the arms 213a, 213b, 223a, 223b can include a series of nozzles 211a, 211b, 221a, 221b, respectively. The nozzles 211a, 211b, 221a, 221b can be distributed (e.g., spaced apart) along lengths of the respective arms 213a, 213b, 223a, 223b to direct fluids outwardly toward the side, front, and rear surfaces of a vehicle during washing and rinsing operations. The nozzles 211a, 211b, 221a, 221b can comprise any suitable type of nozzle, such as fan nozzles, rotary nozzles, etc. The nozzles 211a, 211b, 221a, 221b can be the same type or different types.

The arms 213a, 213b, 223a, 223b can have any suitable configuration. For example, the arms 213a, 213b can be oriented parallel to one another, and the arms 223a, 223b can be oriented parallel to one another such that the arms form an L-configuration. In one aspect, the arms 213a, 213b can be coupled to one another, such that the arm 213b is supported by the arm 213a. Similarly, the arms 223a, 223b can be coupled to one another, such that the arm 223b is supported by the arm 223a. This configuration can effectively provide multiple spray arches located side-by-side.

The portions 210, 220 can include fittings or couplings 212, 222, respectively, to couple the portions 210, 220 to one another. The fitting 212 can serve to couple the car wash spray device 201 to a carriage or other suitable support for the car wash spray device 201. The configuration of arms 213a, 213b, 223a, 223b coupled to the fittings 212, 222 can preserve typical coupling interfaces to facilitate mounting the car wash spray device 201 to a carriage in the typical manner and in the available space without modification. The car wash spray device 201 can have a fluid inlet 230 associated with the fitting 212 to couple to a fluid source. The fittings 212, 222 can facilitate fluid communication between the fluid inlet 230 and the nozzles 211a, 211b, 221a, 221b, so that the nozzles can receive pressurized fluid from the fluid source.

The car wash spray device 201 can include pressure-sensitive valves 214a, 214b, 224a, 224b in fluid communication with the fluid inlet 230 and the spray nozzles 211a, 211b, 221a, 221b to regulate and control flow of fluid to the nozzles. For example, the pressure-sensitive valves 214a, 214b, 224a, 224b can be disposed between the fluid inlet 230 and the respective nozzles 211a, 211b, 221a, 221b. In the embodiment shown in FIG. 2, the arms 213a, 213b, 223a, 223b can include the respective pressure-sensitive valves 214a, 214b, 224a, 224b. Thus, each pressure-sensitive valve 214a, 214b, 224a, 224b can separate the nozzles 211a, 211b, 221a, 221b of the respective arms 213a, 213b, 223a, 223b from the fluid inlet 230. The pressure-sensitive valves can be configured to allow flow of pressurized fluid through the valves at or below a given pressure, or at or above a given pressure. The pressure-sensitive valves may be configured to activate at any suitable pressure, which may or may not be the same pressure, in order to control fluid flow to the nozzles 211a, 211b, 221a, 221b. Any suitable type of pressure-sensitive valve can be utilized in accordance with the principles disclosed herein, such as a suitable StrataFlo® valve. The nozzles 211a, 211b, 221a, 221b can be active (i.e., spraying) at the same time or at different times as regulated by the valves 214a, 214b, 224a, 224b, which are controlled by varying the fluid pressure.

In one embodiment, the nozzles 211a of the arm 213a and the nozzles 221a of the arm 223a can be nozzles (e.g., fan nozzles) that can operate effectively at a relatively low pressure (e.g., about 200 psi). The nozzles 211b of the arm 213b and the nozzles 221b of the arm 223b can be nozzles (e.g., rotary nozzles) that can operate effectively at a relatively high pressure (e.g., about 1000 psi). The pressure-sensitive valves 214a, 224a can therefore be configured to activate or allow flow of pressurized fluid through the valves at or below a given pressure that is greater than 200 psi (e.g., normally open at or below a given pressure and closed above the given pressure). In addition, the pressure-sensitive valves 214b, 224b can be configured to activate or allow flow of pressurized fluid through the valves at or above a given pressure that is less than 1000 psi (e.g., normally closed below a given pressure and open at or above the given pressure). If the nozzles 211a, 221a are to be actively spraying fluid at the same time, and the nozzles 211b, 221b are to be actively spraying fluid at the same time, then the pressure-sensitive valves 214a, 224a can be configured to allow flow of pressurized fluid at or below the same given pressure, and the pressure-sensitive valves 214b, 224b can be configured to allow flow of pressurized fluid at or above the same given pressure. Additionally, if the nozzles 211a, 221a are to be actively spraying only when the nozzles 211b, 221b are not actively spraying, and vice versa, then the activation pressure of the valves 214a, 224a must be less than a given pressure, and the activation pressure of the valves 214b, 224b must be greater than the same given pressure. For example, the activation pressure of the valves 214a, 224a can be about 300 psi, and the activation pressure of the valves 214b, 224b can be about 400 psi to ensure that the nozzles 211a, 221a are not active or "on" when the nozzles 211b, 221b are active or "on". Such selective activation of the functional nozzles can be beneficial when it is desirable to provide certain chemicals or lack of chemicals to a given nozzle type during a wash cycle. For example, it may be desirable to provide soap or other chemicals to fan nozzles, while providing only water to rotary nozzles. This can be controlled by providing soap and other chemicals only at pressures below a given pressure (e.g., corresponding to the activation pressure of the valves 214a, 224a in the example), and providing only water at pressures above a given pressure (e.g., corresponding to the activation pressure of the valves 214b, 224b in the example).

In some embodiments, a pressure relief mechanism 216 can be included in fluid communication with the pressure-sensitive valves 214a, 224a to facilitate reducing the pressure of the pressurized fluid below the activation pressure of the valves 214a, 224a in order to open the valves 214a, 224a and allow flow of the pressurized fluid through the valves 214a, 224a. The pressure relief mechanism 216 can be located anywhere between the fluid inlet 230 and the valves 214a, 224a, 214b, 224b. In the illustrated embodiment, the pressure relief mechanism 216 is associated with the fitting 222. It should be recognized, however, that a pressure relief mechanism can be located anywhere between a fluid source and the pressure-sensitive valves of a car wash spray device.

In the example discussed above, once the fluid pressure has been increased above the activation pressure of 300 psi, the valves 214a, 224a close. An increase of fluid pressure above 400 psi will activate and open the valves 214b, 224b. Upon reducing fluid pressure, the fluid will exit via the nozzles 211b, 221b until the pressure drops below 400 psi. The fluid will also exit via the pressure relief mechanism 216 until the pressure drops below 300 psi, at which point the valves 214a, 224a will open to direct fluid out of the nozzles 211a, 221a. The pressure relief mechanism 216 can therefore serve to "bleed off" pressure between cycles or stages of a car wash to facilitate changing between active nozzles 211b, 221b and active nozzles 211a, 221a.

Any suitable type or number of pressure relief mechanisms can be utilized. For example, the pressure relief mechanism 216 can comprise a valve, a nozzle, a port, an opening, or any other suitable pressure relief mechanism. In some embodiments, the pressure relief mechanism 216 can be automatically actuated. In one example, the pressure relief mechanism 216 can include a spring-loaded pressure relief valve configured to actuate at a given pressure, such as at or below the activation pressure of the valves 214a, 224a. In another example, the pressure relief mechanism 216 can include a solenoid actuated valve controlled by a pressure feedback control loop or controlled by a computer program executing a car wash program. In some embodiments, the pressure relief mechanism 216 can always be active or continually relieving pressure. For example, the pressure relief mechanism 216 can include a nozzle or other opening (e.g., a port, hole, etc.) that is configured to allow pressure to build up sufficient to activate the valves 214b, 224b and provide effective operation of the nozzles 211b, 221b but also bleed off unwanted pressure when the fluid pressure drops in order to open the valves 214a, 224a for operation of the nozzles 211a, 221a. If a nozzle is used to relieve the pressure, for example, relieving nozzle may be a fan nozzle or other car wash nozzle that is aimed toward an automobile that is being sprayed under the arch.

It should be recognized that the pressure-sensitive valves 214a, 224a, 214b, 224b can be configured to provide spray from a group of nozzles when another group of nozzles is or is not spraying. In other words, the pressure-sensitive valves can be configured to turn nozzles "on" or "off" such that the nozzles can be on or off and the same or different times. For example, in the embodiment discussed above, if the valves 214a, 224a have an activation pressure greater than a given pressure, and the valves 214b, 224b have an activation pressure less than the same given pressure, then there will be some overlap as to when the nozzles 211a, 221a and the nozzles 211b, 221b are active. As an example, the activation pressure of the valves 214a, 224a can be about 400 psi, and the activation pressure of the valves 214b, 224b can be about 300 psi. This can provide only active nozzles 211a, 221a below 300 psi, all active nozzles 211a, 221a, 211b, 221b from 300 psi to 400 psi, and only active nozzles 211b, 221b above 400 psi. Thus, controlling fluid pressure can facilitate selective delivery of pressurized fluid through one or more groups of nozzles.

FIG. 3 illustrates a schematic representation of a car wash spray device 301 in accordance with another example of the present disclosure. The car wash spray device 301 is similar to the car wash spray device 201 in many respects. For example, the car wash spray device 301 includes a generally horizontal top portion 310 and a generally vertical lateral portion 320, which can each have multiple arms 313a, 313b, and arms 323a, 323b, respectively. The arms 313a, 313b, 323a, 323b can include one or more nozzles 311a, 311b, 321a, 321b, respectively. The arms 313a, 313b, 323a, 323b can have any suitable configuration. For example, the arms 313a, 313b can be oriented parallel to one another, and the arms 323a, 323b can be oriented parallel to one another. In one aspect, the arms 313a, 313b, 323a, 323b can form an L-configuration.

The portions 310, 320 can include fittings 312a, 312b and fittings, 322a, 322b, respectively, to couple the portions 310, 320 to one another. The fitting 312a can serve to couple the car wash spray device 301 to a carriage or other suitable support for the car wash spray device 301. The fittings 312a, 312b can also be used to couple the arms 313b, 323b to the arms 313a, 323a. This configuration can effectively provide multiple spray arches located side-by-side. The configuration of arms 313a, 313b, 323a, 323b coupled to the fittings 312a-b, 322a-b can preserve typical coupling interfaces to facilitate mounting the car wash spray device 301 to a carriage in the typical manner and in the available space without modification. The car wash spray device 301 can have a fluid inlet 330 associated with the fitting 312a to couple to a fluid source. The fittings 312a-b, 322a-b can facilitate fluid communication between the fluid inlet 330 and the nozzles 311a, 311b, 321a, 321b, so that the nozzles can receive pressurized fluid from the fluid source.

The car wash spray device 301 also includes pressure-sensitive valves 314a, 324a, 315 to regulate or control the flow of fluid to the nozzles 311a, 311b, 321a, 321b as described herein. In this case, the arms 313a, 323a can include the respective pressure-sensitive valves 314a, 324a and can therefore control flow to the nozzles 311a, 321a individually. The pressure-sensitive valve 315 can be disposed between the fittings 312a, 312b (i.e., between the arms 313a, 313b) and can serve to couple the arms 313b, 323b to the arms 313a, 323a. The pressure-sensitive valve 315 can therefore control fluid flow to the nozzles 311b, 321b simultaneously. In this configuration, the fluid inlet 330 is associated with the arm 313a (by the fitting 312a), such that pressurized fluid is received by the arm 313a and delivered through the valve 315 to the arms 313b, 323b. The car wash spray device 301 additionally includes a pressure relief mechanism 316 located between the fluid inlet 330 and the valves 314a, 324a, 315 to facilitate to reducing or bleeding off fluid pressure, as discussed above.

FIG. 4 illustrates a schematic representation of a car wash spray device 401 in accordance with yet another example of the present disclosure. The car wash spray device 401 is similar to the car wash spray devices discussed above in many respects. For example, the car wash spray device 401 includes a generally horizontal top portion 410 and a generally vertical lateral portion 420, which can each have multiple arms 413a, 413b, and arms 423a, 423b, respectively. The arms 413a, 413b, 423a, 423b can include one or more nozzles 411a, 411b, 421a, 421b, respectively. The arms 413a, 413b, 423a, 423b can have any suitable configuration. For example, the arms 413a, 413b can be oriented parallel to one another, and the arms 423a, 423b can be oriented parallel to one another. In one aspect, the arms 413a, 413b, 423a, 423b can form an L-configuration.

The portions 410, 420 can include fittings 412a, 412b and fittings, 422a, 422b, respectively, to couple the portions 410, 420 to one another. The fitting 412a can serve to couple the car wash spray device 401 to a carriage or other suitable support for the car wash spray device 401. The fittings 412a, 412b can be used to couple the arms 413b, 423b to the arms 413a, 423a. This configuration can effectively provide multiple spray arches located side-by-side. The configuration of arms 413a, 413b, 423a, 423b coupled to the fittings 412a-b, 422a-b can preserve typical coupling interfaces to facilitate mounting the car wash spray device 401 to a carriage in the typical manner and in the available space without modification. The car wash spray device 401 can have a fluid inlet 430 associated with the fittings 412a, 412b to couple to a fluid source. Although the fluid inlet 430 is illustrated as two separate inlets, the fluid inlet 430 is a common inlet that is in fluid communication with both the fittings 412a, 412b, such as via a Y-junction. The fittings 412a-b, 422a-b can facilitate fluid communication between the fluid inlet 430 and the nozzles 411a, 411b, 421a, 421b, so that the nozzles can receive pressurized fluid from the fluid source.

The car wash spray device 401 also includes pressure-sensitive valves 415a, 415b to regulate or control the flow of fluid to the nozzles 411a, 411b, 421a, 421b as described herein. In this case, the pressure-sensitive valves 415a, 415b are associated with the fittings 412a, 412b, which are coupled directly to one another with no fluid communication between the fittings 412a, 412b. In this configuration, the fluid inlet 430 is coupled to the arms 413a, 423a via the valve 415a, and the fluid inlet 430 is coupled to the arms 413b, 423b via the valve 415b. The pressure-sensitive valve 415a can therefore control flow to the nozzles 411a, 421a simultaneously, and the pressure-sensitive valve 415b can therefore control flow to the nozzles 411b, 421b simultaneously. The car wash spray device 401 additionally includes a pressure relief mechanism 416 located between the fluid inlet 430 and the valves 415a, 415b to facilitate to reducing or bleeding off fluid pressure, as discussed above.

Furthermore, in accordance with one embodiment of the present invention, a method for washing a car is disclosed. The method can comprise obtaining a car wash spray device having a fluid inlet coupled to a fluid source to receive a pressurized fluid from the fluid source, a first spray nozzle, a first pressure-sensitive valve in fluid communication with the fluid inlet and the first spray nozzle, the first pressure-sensitive valve being configured to allow flow of the pressurized fluid therethrough at or below a first pressure, a second spray nozzle, and a second pressure-sensitive valve in fluid communication with the fluid inlet and the second spray nozzle, the second pressure-sensitive valve being configured to allow flow of the pressurized fluid therethrough at or above a second pressure. The method can also comprise providing the pressurized fluid to the fluid inlet at a pressure at or below the first pressure to deliver the pressurized fluid through the first nozzle. Additionally, the method can comprise providing the pressurized fluid to the fluid inlet at a pressure at or above the second pressure to deliver the pressurized fluid through the second nozzle. It is noted that no specific order is required in this method, though generally in one embodiment, these method steps can be carried out sequentially.

In one aspect, the second pressure is greater than the first pressure to deliver the pressurized fluid through the first nozzle or the second nozzle, and the method can further comprise reducing pressure between the fluid source and the first pressure-sensitive valve below the first pressure to allow flow of the pressurized fluid through the first pressure-sensitive valve. In another aspect of the method, the first nozzle comprises a fan nozzle. In yet another aspect of the method, the second nozzle comprises a rotary nozzle.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Furthermore, the terms "comprises," "comprising," "includes," "including," "having," and the like can have the meaning ascribed to them in U.S. patent law, and are generally interpreted to be open ended terms. The term "consisting of" is a closed term, and includes only the devices, methods, compositions, components, structures, steps, or the like specifically listed, and that which is in accordance with U.S. patent law. "Consisting essentially of" or "consists essentially" or the like, when applied to devices, methods, compositions, components, structures, steps, or the like encompassed by the present disclosure, refers to elements like those disclosed herein, but which may contain additional structural groups, composition components, method steps, etc. Such additional structural groups, composition components, methods steps, etc., however, do not materially affect their basic and novel characteristic(s) compared to those of the corresponding structural groups, composition components, methods steps, etc. disclosed herein. When using an open ended term, like "comprising" or "including," it is understood that direct support should be afforded also to "consisting essentially of" language as well as "consisting of" language as if stated explicitly.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A car wash spray device, comprising:
   a fluid inlet to receive a pressurized fluid from a fluid source;
   a first spray nozzle;
   a first pressure-sensitive valve in fluid communication with the fluid inlet and the first spray nozzle, the first pressure-sensitive valve being configured to allow flow of the pressurized fluid therethrough at or below a first pressure;
   a pressure relief mechanism in fluid communication with the first pressure-sensitive valve to facilitate reducing pressure of the pressurized fluid below the first pressure to allow flow of the pressurized fluid through the first pressure-sensitive valve;
   a second spray nozzle; and
   a second pressure-sensitive valve in fluid communication with the fluid inlet and the second spray nozzle, the second pressure-sensitive valve being configured to allow flow of the pressurized fluid therethrough at or above a second pressure, wherein the second pressure is greater than the first pressure to facilitate delivery of the pressurized fluid through the first nozzle or the second nozzle,
   wherein controlling a pressure of the pressurized fluid facilitates delivery of the pressurized fluid through at least one of the first nozzle and the second nozzle.

2. The car wash spray device of claim 1, wherein the pressure relief mechanism comprises a valve, a nozzle, a port, an opening, or a combination thereof.

3. The car wash spray device of claim 1, further comprising a first arm including the first spray nozzle, and a second arm including the second spray nozzle, wherein the first and second arms are coupled to one another.

4. The car wash spray device of claim 3, wherein the first and second arms are oriented parallel to one another.

5. The car wash spray device of claim 3, wherein the first and second arms comprise pipes that at least partially define fluid conduits between the first and second pressure sensitive valves and the first and second spray nozzles, respectively.

6. The car wash spray device of claim 3, wherein the first arm comprises the first pressure-sensitive valve, and the second arm comprises the second pressure-sensitive valve.

7. The car wash spray device of claim 6, further comprising:
a third arm including a third spray nozzle and a third pressure-sensitive valve in fluid communication with the fluid inlet and the third spray nozzle, the third pressure-sensitive valve being configured to allow flow of the pressurized fluid therethrough at or below a third pressure; and
a fourth arm including a fourth spray nozzle and a fourth pressure-sensitive valve in fluid communication with the fluid inlet and the fourth spray nozzle, the fourth pressure-sensitive valve being configured to allow flow of the pressurized fluid therethrough at or above a fourth pressure,
wherein the first arm and the second arm are oriented parallel to one another, and the third arm and the fourth arm are oriented parallel to one another such that the arms form an L-configuration.

8. The car wash spray device of claim 7, wherein the first and third pressures are equal, and the second and fourth pressures are equal.

9. The car wash spray device of claim 3, wherein the first arm is supported by the second arm, or the second arm is supported by the first arm.

10. The car wash spray device of claim 3, wherein the first pressure-sensitive valve or the second pressure-sensitive valve is disposed between the first and second arms.

11. The car wash spray device of claim 3, wherein the fluid inlet is associated with the first arm or the second arm, such that the pressurized fluid is received by the first arm or the second arm and delivered to the other of the first arm and the second arm.

12. The car wash spray device of claim 3, wherein the fluid inlet is coupled to the first and second arms via the first and second pressure-sensitive valves, respectively.

13. The car wash spray device of claim 1, wherein the first nozzle comprises a fan nozzle.

14. The car wash spray device of claim 1, wherein the second nozzle comprises a rotary nozzle.

15. A car wash spray system, comprising:
a fluid source; and
a car wash spray device having
a fluid inlet coupled to the fluid source to receive a pressurized fluid from the fluid source;
a first spray nozzle;
a first pressure-sensitive valve in fluid communication with the fluid inlet and the first spray nozzle, the first pressure-sensitive valve being configured to allow flow of the pressurized fluid therethrough at or below a first pressure;
a pressure relief mechanism in fluid communication with the first pressure-sensitive valve to facilitate reducing pressure of the pressurized fluid below the first pressure to allow flow of the pressurized fluid through the first pressure-sensitive valve;
a second spray nozzle; and
a second pressure-sensitive valve in fluid communication with the fluid inlet and the second spray nozzle, the second pressure-sensitive valve being configured to allow flow of the pressurized fluid therethrough at or above a second pressure, wherein the second pressure is greater than the first pressure to facilitate delivery of the pressurized fluid through the first nozzle or the second nozzle,
wherein controlling a pressure of the pressurized fluid facilitates delivery of the pressurized fluid through at least one of the first nozzle and the second nozzle.

16. The system of claim 15, further comprising a movable carriage supporting the car wash spray device, the movable carriage being configured to move the car wash spray device in translational and rotational degrees of freedom.

17. A method for washing a car, comprising washing a car utilizing the spray device of claim 1.

18. The method of claim 17, wherein washing the car includes:
providing the pressurized fluid to the fluid inlet at a pressure at or below the first pressure to deliver the pressurized fluid through the first nozzle; and
providing the pressurized fluid to the fluid inlet at a pressure at or above the second pressure to deliver the pressurized fluid through the second nozzle.

19. The method of claim 17, wherein the first nozzle comprises a fan nozzle.

20. The method of claim 17, wherein the second nozzle comprises a rotary nozzle.

* * * * *